United States Patent

Horiuchi et al.

[11] Patent Number: 5,803,361
[45] Date of Patent: Sep. 8, 1998

[54] FUEL INJECTOR FOR INTERNAL COMBUSTION ENGINES

[75] Inventors: Shigeaki Horiuchi; Takeshi Tokumaru, both of Fujisawa, Japan

[73] Assignee: Isuzu Motors Limited, Tokyo, Japan

[21] Appl. No.: 796,427

[22] Filed: Feb. 6, 1997

[30] Foreign Application Priority Data

Feb. 13, 1996 [JP] Japan .................................. 8-048463

[51] Int. Cl.$^6$ .................................................. F02M 47/02
[52] U.S. Cl. .................................... 239/88; 239/533.8
[58] Field of Search ........................... 239/88, 96, 533.8, 239/533.9, 584

[56] References Cited

U.S. PATENT DOCUMENTS

| | | | |
|---|---|---|---|
| 3,995,813 | 12/1976 | Bart et al. | 239/584 |
| 4,728,074 | 3/1988 | Igashira et al. | 239/584 X |
| 4,909,440 | 3/1990 | Mitsuyasu et al. | 239/96 |
| 5,630,550 | 5/1997 | Kurishige et al. | 239/584 X |

FOREIGN PATENT DOCUMENTS 3-000964  1/1991  Japan .
7-133748  5/1995  Japan .

Primary Examiner—Kevin P. Shaver
Assistant Examiner—Steven J. Ganey
Attorney, Agent, or Firm—Browdy and Neimark

[57] ABSTRACT

This fuel injector for internal combustion engines makes the best use of the responsiveness of a piezoelectric element and the leakage resistance and fixing easiness of a solenoid type fuel injection nozzle, and secures a sufficient lift of a control piston. In this fuel injector, a control piston is connected to and controls a sliding movement of a needle valve, and a return spring provided in a fuel chamber urges the needle valve in the injection port closing direction, the lift of the control piston being controlled by a piezoelectric element which is adapted to be displaced in accordance with voltage variation. The displacement of the piezoelectric element is increased by the effect of lever and fulcrum of a displacement increasing mechanism, and the resultant displacement is transmitted to the control piston, whereby the lift of the control piston and needle valve is secured.

7 Claims, 4 Drawing Sheets

FUEL INJECTOR FOR INTERNAL COMBUSTION ENGINES

BACKGROUND OF THE INVENTION

1. Field of the Invention

This invention relates to a fuel injector for internal combustion engines, adapted to inject a fuel into a combustion chamber.

2. Description of the Prior Art

The conventional injectors, i.e. fuel injection valves include, for example, a fuel injection valve disclosed in Japanese Patent Laid-Open No. 133748/1995. In this injection valve, a needle valve is controlled by using a piezoelectric element, a push spring being inserted at its inner side through the needle valve and provided with an extension portion extending toward a restriction member of a pressure control chamber, a needle stopper being formed on the part of a wall surface of the pressure control chamber which is around the restriction member. The push spring is on the outer side of the pressure control chamber, and the extension portion is projected into the same chamber, so that the volume of this chamber decreases. The area of the stopper can be increased irrespective of the push spring by reducing the inner diameter of the restriction member. In this fuel injection valve, the amount of displacement of the piezoelectric element is small, and therefore a system for increasing the area ratio of the piezoelectric element so as to set the amount of displacement thereof to a level corresponding to that of displacement of the needle valve is employed. When a voltage is applied to the piezoelectric element, a pressure in the pressure control chamber works on an upper end surface of a needle shaft in the needle valve-closing direction. When the application of a voltage to the piezoelectric element is discontinued, the pressure in the pressure control chamber escapes from the restriction in the upward direction, so that the needle valve is lifted by a high-pressure fuel and injects a fuel into a combustion chamber. The upper end surface of the needle shaft constitutes a stopper for the upward movement of the needle valve. The pressure control chamber is designed elaborately so as to reduce the volume thereof. A disc spring is utilized as a member for generating a returning force when the piezoelectric element is displaced.

The conventional electromagnetic fuel injector for diesel engines include a fuel injector disclosed in Japanese Patent Laid-Open No. 964/1991. In this electromagnetic fuel injector for diesel engines, the controlling of a pressure control chamber is done by a solenoid, and a space around a control piston and a plunger forms a high-pressure chamber for a fuel. The plunger is not provided with an oil feed port, and the plunger and control piston are formed to an integral body. In this electromagnetic fuel injector, a pressurized fuel is supplied to a control chamber formed by an injector body and a sleeve and adapted to control the plunger, and an injection chamber storing therein a fuel to be injected. Therefore, passages separated into two are formed in the injector body and sleeve. The supplying of a fuel to the control chamber is done through a supply orifice or an annular recess formed in the injector body.

In the above-described fuel injection valve, the sliding shaft portion at an upper part of the needle valve is short. Accordingly, when the pressure in the pressure control chamber is high, and, when the needle valve is lifted, the fuel is liable to leak. The piezoelectric element and needle valve are formed close to each other and to small lengths, and it is difficult to fix the fuel injection valve in an inserted state to a cylinder head in practice since the space is not sufficiently provided due to the ports provided around the fuel injection valve. Although the amount of displacement of the piezoelectric element is increased by increasing the area ratio, the responsiveness thereof to the pilot injection the intervals of which are reduced by making the best use of the characteristics of the piezoelectric element is deteriorated since the restriction is provided, and since the force is transmitted via a compressive liquid.

In this fuel injection valve, a piezoelectric element is used for controlling the pressure control chamber. The amount of displacement of a piezoelectric element of general diameter and length used for an injector is around 0.1 mm. Therefore, it is essential concerning the use of a piezoelectric element to develop the techniques for compensating for the small amount of displacement of the piezoelectric element. In order to fully display the advantageous features of the use of a piezoelectric element, it is important not to deteriorate the responsiveness of the needle valve. This is what is demanded in the controlling of the fuel injection.

In the above-described electromagnetic fuel injector for diesel engines, the pressure in the pressure control chamber is controlled by a solenoid. Although the solenoid has an advantage that it can attain a large amount of displacement as compared with the piezoelectric element mentioned above, the responsiveness becomes low, and the controllability with respect to the pilot injection which demands highly accurate and delicate timing is not preferably high. Moreover, the positive cut off of main fuel injection is rather slow correspondingly to the low responsiveness as compared with that in the case where a piezoelectric element is used. Consequently, it can be said that a method of controlling the pressure in the pressure control chamber which uses a solenoid is inferior to a similar method using a piezoelectric element. In order to improve the performance of the power generated by a solenoid, the diameter thereof necessarily becomes large, so that the fuel injector using a solenoid does not meet a layout requirement for compactness.

SUMMARY OF THE INVENTION

An object of this invention is to provide a fuel injector for internal combustion engines, constructed so that a control piston can be controlled properly by displaying the advantageous responsiveness of a piezoelectric element utilized for the controlling of fuel injection, and increasing the amount of displacement of the piezoelectric element on application of a voltage thereto by incorporating a displacement increasing mechanism in the fuel injector; capable of properly securing the lift of a needle valve via the control piston and a sleeve, improving the responsiveness of the needle valve, minimizing the leakage amount of a high-pressure fuel by securing a sufficient length of a sliding portion.

This invention relates to a fuel injector for internal combustion engines, comprising an injector body provided with fuel injection ports, a needle valve adapted to be lifted in the injector body and open the injection ports, a control piston joined to the needle valve and adapted to control the sliding movement of the needle valve, a fuel chamber formed in the injector body so as to store a fuel therein, a return spring provided in the fuel chamber and adapted to urge the needle valve in the fuel port closing direction, a piezoelectric element adapted to be displaced in accordance with voltage variation so as to control the lift of the control piston, and a displacement increasing mechanism adapted to increase the displacement of the piezoelectric element so as to lift the needle valve, and transmit the resultant displacement to the control piston.

The displacement increasing mechanism comprises a pressure member fixed to the piezoelectric element and provided on its outer circumferential surface with projecting portions having points of application of a displacement force, a hollow support member fixed in the interior of the injector body and provided with fulcrum projecting portions, a lift member provided liftably in a hollow portion of the support member, and a disc spring set between the pressure member and support member with an inner circumferential end portion thereof engaged with the lift member.

The disc spring is provided between the pressure member and support member so that an outer portion of the disc spring is engaged with the projecting portions having points of application of the pressure member and the portion of the disc spring which is inner than the point of application thereof is engaged with the fulcrum projecting portions of the support member. The distance between the projecting portions having points of application of the pressure member and the opposed fulcrum projecting portions of the support member is set shorter than that between the fulcrum projecting portions and a point of engagement at which the disc spring is engaged with the lift member.

The lift member is a valve for opening and closing a discharge passage for releasing the fuel pressure in a balancing chamber which is formed by a control sleeve fixed to the injector body, and which is adapted to control the lift of the needle valve by a fuel pressure.

In another embodiment, the lift member is provided slidably in the control sleeve formed into a unitary body with the support member fixed to the injector body, and it is fixed to an upper end portion of the control piston connected to the needle valve.

In another embodiment, a lower end surface of the lift member is positioned slidably in the control sleeve formed into a unitary body with the support member fixed to the injector body, and it is engaged with an upper end surface of the control piston joined to the needle valve.

In a further embodiment, the lift member is formed into a unitary body with the control piston provided slidably in the injector body, and the lower end surface of the control piston is engaged with a spring seat on which the return spring sits. The needle valve is pressed down in the injection port closing direction by the resilient force of the return spring and disc spring.

As described above, the displacement increasing mechanism in this fuel injector is formed by a pressure member provided with projecting portions having points of application of a displacement force, a support member provided with fulcrum projecting portions, and a lift member capable of being lifted by a disc spring provided between the pressure member and support member. Accordingly, the displacement of the pressure member, to which the displacement of the piezoelectric element is transmitted in the original size is transmitted in a magnified manner on principles of lever and fulcrum, to the lift member via the support member as a fulcrum. The lift member can be formed so that it releases the fuel pressure in the balancing chamber by which the control piston is lowered, and so that it is connected directly to the control piston and lifts the same directly.

Since this fuel injector is constructed as described above, a fine injection quantity control operation and a fine injection rate control operation including the controlling of pilot injection of short intervals and several times of pilot injection can be carried out by utilizing the excellent responsiveness of the piezoelectric element, and the leakage amount of a high-pressure fuel can be reduced to the lowest level by securing a sufficient length of a sliding portion by using the control piston and sleeve. Moreover, the fuel injector enables a suitable distance to be secured between the piezoelectric element and needle valve with respect to the cylinder head, the diameter of a shaft of a part which requires a spatially severe mounting condition to be reduced, the designing requirement concerning the mounting of the fuel injector to be met easily, and the injector itself to be formed to a compact structure.

DESCRIPTION OF THE PREFERRED EMBODIMENTS

The embodiments of the fuel injector for internal combustion engines according to the present invention will now be described with reference to the drawings. This fuel injector for internal combustion engines is fixed in a sealed state via a seal member in a bore provided in a base, such as a cylinder head (not shown), and it is applied to a common rail injection system or an accumulator injection system, in which a high-pressure fuel supplied through a common rail to which a fuel is supplied from a fuel injection pump is injected into each of combustion chambers provided in an internal combustion engine.

Figure 1:
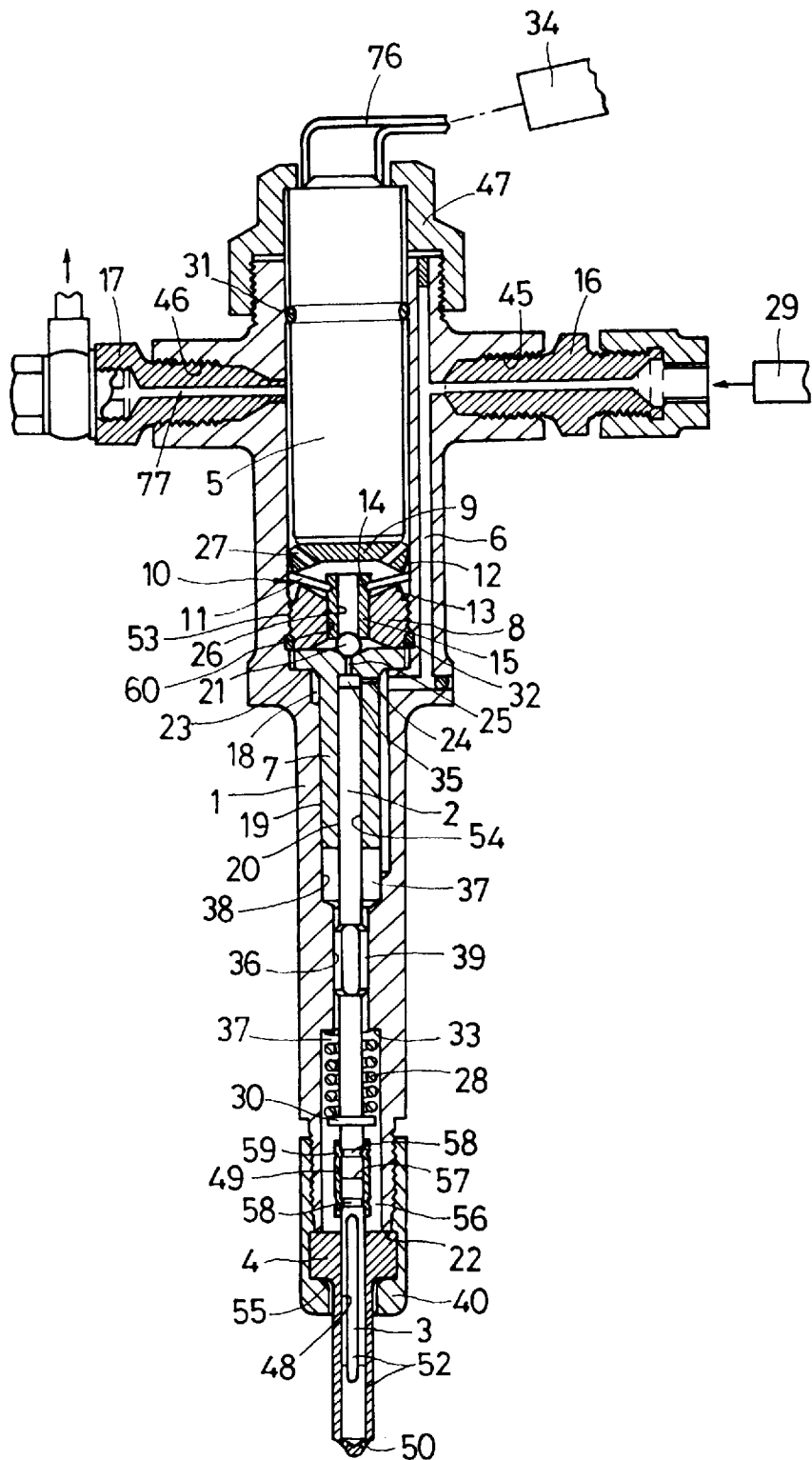
FIG. 1 is a sectional view showing a first embodiment of the fuel injector for internal combustion engines according to the present invention.

A first embodiment of the fuel injector for internal combustion engines according to the present invention will now be described with reference to FIG. 1. This fuel injector for internal combustion engines comprises a holder 1 to which a nozzle body 4 provided with injection ports 50, from which a fuel is injected into a combustion chamber, is fixed, a needle valve 3 adapted to be lifted in the interior of the holder 1 and nozzle body 4 and open the injection ports 50, a control piston 2 joined to the needle valve 3 and adapted to control the sliding movement thereof, a fuel chamber 37 formed in the injector body 1, 4 and adapted to store the fuel in the holder 1 and nozzle body 4, a return spring 28 provided in the fuel chamber 37 and urging the needle valve 3 in the injection port closing direction, a piezoelectric element 5 adapted to be displaced in accordance with voltage variation and adapted to control the lift of the control piston 2, and a displacement increasing mechanism 10 adapted to increase the displacement amount of the piezoelectric element 5 for the purpose of lifting the needle valve and transmit the resultant displacement to the control piston 2.

The displacement increasing mechanism 10 comprises a pressure member 9 fixed to the piezoelectric element 5 and provided on an outer circumference thereof with projecting portions 13 constituting points of application of a displacement force, a support member 8 with a hollow fixed in the holder 1 and provided with fulcrum projecting portions 13, a lift member 15 provided liftably in a hollow 60 of the support member 8, and a disc spring 11 set between the pressure member 9 and support member 8 with an inner circumferential end portion 14 thereof engaged with the lift member 15. The disc spring 11 is provided between the pressure member 9 and support member 8 so that it is engaged at outer portions thereof with the projecting portions 12 constituting points of application of the pressure member 9, and at the parts thereof which are inner than the application point thereof with the fulcrum projecting portions 13 of the support member 8. Especially, the distance between the projecting portions 12 constituting the points of application of the pressure member 9 and the fulcrum projecting portions 13 of the support member 8 is set shorter than that between the fulcrum projecting portions 13 and a point of engagement on the lift member 15 at which the disc spring 11 is engaged.

In this fuel injector for internal combustion engines, the support member 8 is provided in its outer circumference with a thread 53, which is engaged with a thread formed in a wall surface of a central through bore 38 of the holder 1, whereby the support member 8 is screwed and fixed to the holder 1. The lift member 15 is provided liftably and slidably in the hollow 60 of the support member 8, and adapted to press a ball 21 against a valve seat of a control sleeve 7 by a resilient force of the disc spring 11 when the piezoelectric element 5 is not energized, to close an orifice 25. When a voltage is applied from a control unit 34 to the piezoelectric element 5, the piezoelectric element 5 is displaced, and the displacement amount is transmitted to the pressure member 9, which is thereby lowered. The force by which the pressure member 9 is lowered causes an outer circumferential surface of the disc spring 11 to be pressed down against the resilient force of the spring via the projecting portions 12 thereof. The downward displacement amount of the outer circumferential surface of the disc spring 11 causes the inner circumferential end thereof to be displaced upward via the projecting portions 13 of the support member 8 as fulcrums. During this time, the amount of the upward displacement of the inner circumferential end of the disc spring 11 is increased on the principles of lever and fulcrum of the displacement increasing mechanism 10. This upward displacement amount is large enough to lift the control piston 2.

In the first embodiment, the lift member 15 forms a valve operated in cooperation with a ball 21 so that the lift member 15 is lifted with the lift amount thereof increased through the displacement increasing mechanism owing to the energization of the piezoelectric element 5 to release the downward force of the ball 21 which closes the orifice 25, and discharge a fuel pressure in the balancing chamber 35, which is formed in the control sleeve 7 fixed in the holder 1, through the orifice 25. Namely, the fuel pressure in the balancing chamber 35 is leaked owing to the energization of the piezoelectric element 5, and the needle valve 3 is lifted by the fuel pressure. When the energization of the piezoelectric element 5 is discontinued, a high-pressure fuel is supplied to the interior of the balancing chamber 35, and this fuel pressure and the resilient force of the return spring 28 cause the control piston 2 to lower the needle valve 3 and close the injection ports 50 therewith.

In this fuel injector for internal combustion engines, the nozzle body 4 is fixed to the lower end portion of the holder 1 by screwing a sleeve nut 40 to a threaded portion of the holder 1, and the lower end surface of the holder 1 and an upper end surface of the nozzle body 4 form a mating face 22 constituting a seal surface. An outer circumferential surface of the nozzle body 4 has a larger-diameter portion at an upper part thereof, and a smaller-diameter portion at a lower part thereof, and the sleeve nut 40 is screwed to the threaded portion of the holder 1 in the condition that the sleeve nut 40 is fitted around a stepped surface 55 of the lower part of the nozzle body 4.

The holder 1 is provided in its upper portion with threaded bores 45, 46 for fixing a threaded fuel supply plug 16 and a leak-off plug 17 therein. The fuel supply plug 16 and leak-off plug 17 are screwed to the threaded bores 45, 46 of the holder 1. The piezoelectric element 5 is fixed in the upper end portion of the holder 1 by screwing a sleeve nut 47 on a threaded portion of the holder 1. A clearance between the piezoelectric element 5 and the holder 1 and sleeve nut 47 is sealed with a seal member 31. Into this fuel injector, a fuel from a common rail 29, a high-pressure fuel supply source, is supplied through the fuel supply plug 16. In this fuel injector, a voltage of an operating signal from a control unit 34 is applied from a terminal to the piezoelectric element 5 through a connector or a harness 76. The piezoelectric element 5 constitutes a piezoelectric actuator for releasing the fuel pressure in the balancing chamber 35 which is imparted to the needle valve 3, through a discharge passages (orifice and through port 27 of the pressure member 9).

The sealing of clearances between the holder 1 and the fuel supply plug 16 and leak-off plug 17 is done by inserting seal members therebetween. The holder 1 is provided with a central through bore 38 through which a valve disc is inserted, and a fuel passage 6 communicating the central through bore 38 and a fuel inlet of the fuel supply plug 16 with each other. The holder 1 is further provided in the substantially intermediate part of the central through bore 38 thereof with a guide portion 39 formed by reducing the diameter of the through bore 38, the control piston 2 of the valve body pass through the interior of the guide surface 36 and provided with the guide portion 39 fitted with the guide surface 36. The central through bore 38 of the holder 1 forms there-through and around the control piston 2 a fuel chamber 37 in which a fuel is stored. The nozzle body 4 is provided with a central through bore 48 communicating with the central through bore 38 and having the needle valve 3 of the valve disc passed therethrough, and injection ports 50 from which the fuel is injected into a combustion chamber (not shown).

The control piston 2 and needle valve 3 are connected together by a connecting member 49. The control piston 2 and needle valve 3 are disposed with their end surfaces abutted to each other at a contact surface 57, and they are retained unitarily in the axial direction by the connecting member 49 having a resilient force which permits a deviation of the axes of the piston and needle valve in the direction perpendicular to that of the axes thereof. The connecting member 49 comprises a resilient body, such as a plate spring formed in the shape of a split ring, which is elastically deformable in the diametrical direction thereof. The control piston 2 is provided with an annular groove 58 in a lower end portion thereof, while the needle valve 3 is provided with an annular groove 58 in an upper end portion thereof. The connecting member 49 is provided at both end portions thereof with beads 59 constituting inwardly projecting locking parts. The connecting member 49 is fitted around both of the opposed end portions of the needle valve 3 and control piston 2, and the beads 59 of the connecting member 49 are fitted in the annular grooves 58 in the control piston 2 and needle valve 3.

In a region in which the control piston 2 and needle valve 3 are connected by the connecting member 49, a fuel chamber 56 communicating with the fuel chamber 37 is formed. The needle valve 3 is slidably inserted in the central through bore 48 of the nozzle body 4 so as to form a clearance 52, and a free end face of the needle valve sits on a seat surface formed in the wall, in which the injection ports 50 are provided, of the nozzle body 4. The clearance 52 formed around the needle valve 3 constitutes a passage for a high-pressure fuel. A sliding surface having the clearance 52 is formed between the central through bore 48 of the nozzle body 4 and the outer circumferential surface of the needle valve 3. The control piston 2 is formed so that the sum of the fuel pressure imparted to the outer surface thereof exposed to the interior of the fuel chamber 37 becomes zero. The valve disc comprising the control piston 2 and needle valve 3 is formed so that the valve disc is moved up by the fuel pressure imparted to the needle valve 3 to enable the injection ports 50 to be opened. In the first embodiment, the valve disc is lifted when the fuel pressure imparted to a tapering surface of a free end portion of the needle valve 3 which sits on the injection ports 50 and opens or closes the same becomes higher than the sum of the resilient force of the return spring 28 and the fuel pressure in the balancing chamber 35 which is imparted to the upper surface of the control piston 2.

The control sleeve 7 is fitted in the central through bore 38 of the holder 1, and forms a fitting surface 19 serving also as a seal surface. A shoulder portion of the control sleeve 7 is engaged with an upper stepped portion of the central through bore 38 to form a bumping seal surface 23. An annular chamber 18 is formed between the outer surface of the control sleeve 7 and the central through bore 38 of the holder 1. The control sleeve 7 is fixed in the holder 1 by the support member 8 provided with a bore 60 and screwed to the threaded portion of the holder 1. The sealing of the clearance between the holder 1 and control sleeve 7 is effected by a seal member 32. The annular chamber 18 communicates with the fuel passage 6. A downwardly opened bore 54 of the control sleeve 7 has a slide surface 20 in which the control piston 2 is slidably fitted, and also the balancing chamber 35 in the upper portion thereof which is above the upper surface of the control piston 2. The balancing chamber 35 communicates with the annular chamber 18 through the orifice 24. The control sleeve 7 is provided with an orifice 24 communicating the balancing chamber 35 and annular chamber 18 with each other, and an orifice 25 communicating the upper surface of the control sleeve 7. The balancing chamber 35 has a function of controlling the lift of the control piston 2 by the fuel pressure therein.

In this fuel injector, the support member 8 fixing the control sleeve 7 to the holder 1 is provided with a hollow portion, in which the lift member 15 is fitted. The bore 26 of the lift member 15 is provided therein with the ball 21 capable of opening and closing an outlet of the orifice 25. When the piezoelectric element 5 is energized to cause the lift member 15 to be lifted, the ball 21 opens the orifice 25. When the ball 21 opens the orifice 25, the fuel supplied to the interior of the balancing chamber 3 is discharged therefrom to a leak-off passage 77 in the leak-off plug 17 through the orifice 25 and bore 26 since the bore 26 communicates with the through port 27 of the pressure member 9.

The fuel injector of the above-described construction further has a return spring 28 provided in the fuel chamber 37, a spring retainer 30 supporting a lower end of the return spring 28 and fixed to the control piston 2, and a stepped portion 33 receiving an upper end of the return spring 28 and formed on the wall of the holder 1. The return spring 28 has a function of returning the needle valve 3 by applying a resilient force to the same in the direction in which the injection ports 50 are closed.

The fuel injector according to the present invention is constructed as described above, and operated as follows. In this fuel injector, the piezoelectric element is not in an energized state, and the ball 21 is pressed by the lift member 15 in the downward direction in which the orifice 25 is closed, the orifice 25 being closed with the ball 21. In this condition, a high-pressure fuel is supplied from the common rail 29 to the fuel passage 6 through the fuel inlet plug 16. The fuel chamber 37 formed around the control piston 2 and needle valve 3 is filled with the high-pressure fuel through the fuel passage 6. The clearance 52 formed between the outer circumference of the needle valve 3 and the nozzle body 4 is also filled with the high-pressure fuel. The high-pressure fuel is charged to the interior of the annular chamber 18 through the fuel passage 6, and the balancing chamber 35 from the annular chamber 18 through the orifice 24. The high-pressure fuel with which the fuel chamber 37 is filled is sealed by the seal member 32.

When the orifice 25 is closed with the ball 21, the high fuel pressure supplied to the balancing chamber 35 through the fuel passage 6, annular chamber 18 and orifice 24 is applied to the upper surface of the control piston 2 and works as a force for lowering the control piston 2. The resilient force of the return spring 28 works as a force for lowering the valve disc. The fuel pressure imparted to the tapering surface of the free end portion of the needle valve 3 sitting on the injection ports 50 of the nozzle body 4 works as a force for lifting the valve disc. The lowering force of the sum of the pressing force imparted to the control piston 2 in the balancing chamber 35 and the resilient force of the return spring 28 is set so as to exceed the fuel pressure imparted to the tapering surface of the free end portion of the needle valve 3, so that the pressure is balanced in the condition in which the injection ports 50 are closed with the needle valve 3.

When a voltage is applied to the piezoelectric element 5 in accordance with an instruction from the control unit 34, the piezoelectric element is displaced. The amount of displacement of the piezoelectric element 5 is increased on the principles of lever and fulcrum of the displacement increasing mechanism 10, and the disc spring 11 lifts the lift member 15. When the lift member 15 is lifted, the ball 21 is released and the orifice 25 is opened. When the orifice 25 is opened, the high-pressure fuel in the balancing chamber 35 is discharged to the bore 26 through the orifice 25, and then from the bore 26 to the leak-off plug 17 through the through port 27, this fuel being then returned to the fuel tank. When the high-pressure fuel in the balancing chamber 35 is discharged, the force in the balancing chamber 35 for lowering the control piston 2 is reduced. Consequently, the fuel pressure imparted to the needle valve 3 overcomes sum of lowering force, so that the needle valve 3 moves up to open the injection ports 50, whereby the injection of the fuel into a combustion chamber (not shown) is carried out.

When the energization of the piezoelectric element 5 is discontinued in accordance with an instruction from the control unit 34, the lowering force of the pressure member 9 applied to the disc spring 11 is lost to cause the displacement increasing mechanism to become ineffective, and the resilient force of the disc spring 11 works on the lift member 15 to lower the same, whereby the ball 21 is pressed against the orifice 25 to close the same. When the orifice 25 is closed, the high-pressure fuel from the common rail 29 is supplied to the balancing chamber 35 through the fuel passage 6, annular chamber 18 and orifice 24 and stored therein again. The high-pressure fuel in the balancing chamber 35 works on the upper surface of the control piston 2 again and lower the same, and the control piston lowering force overcomes the fuel pressure imparted to the needle valve 3. The needle valve 3 is therefore pressed down to close the injection ports 50 and finish the fuel injection therefrom. This fuel injector repeats these operations and enables a fuel to be injected intermittently into a combustion chamber.

Figure 2:
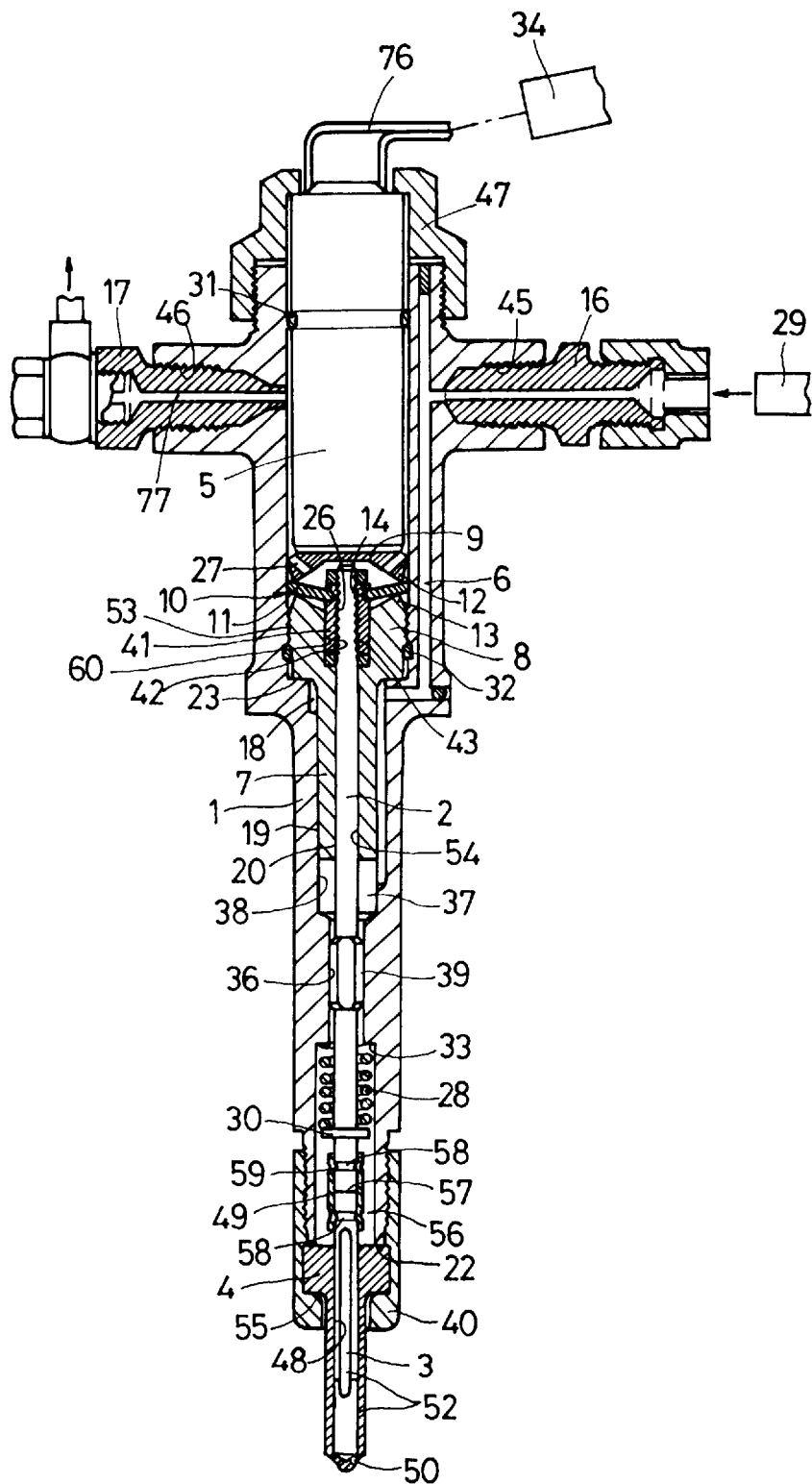
FIG. 2 is a sectional view showing a second embodiment of the fuel injector for internal combustion engines according to the present invention.

A second embodiment of the fuel injector for internal combustion engines according to the present invention will now be described with reference to FIG. 2. As compared with the first embodiment, the second embodiment is not provided with a balancing chamber in a pressure control chamber, and has a thread 42 on the wall surface of a bore 26 of a lift member 41. Referring to FIG. 2, the parts identical with those shown in FIG. 1 are designated by the same reference numeral, and the duplication of descriptions thereof is omitted. The thread 42 of the lift member 41 is screwed to a thread 43 formed on an upper end portion of a control piston 2, whereby the lift member 41 is fixed to the control piston 2 joined to a needle valve 3, the control piston 2 being moved slidingly in a control sleeve 7 which is integral with a support member 8. The support member 8 is formed with the control sleeve 7 into a unitary body. Since the control piston 2 and needle valve 3 are joined together by a connecting member 49, a vertical movement of the control piston 2 is transmitted as a vertical movement of the needle valve 3. The control piston 2 is lowered by a disc spring 11 and a return spring 28 to cause the needle valve 3 to close injection ports 50. When the resilient force of the disc spring is released, the needle valve 3 is lifted with the fuel pressure imparted thereto overcoming the resilient force of the return spring 28. Since a displacement increasing mechanism 10 in the second embodiment has substantially the same construction and function as that 10 in the first embodiment, the description thereof is omitted.

Figure 3:
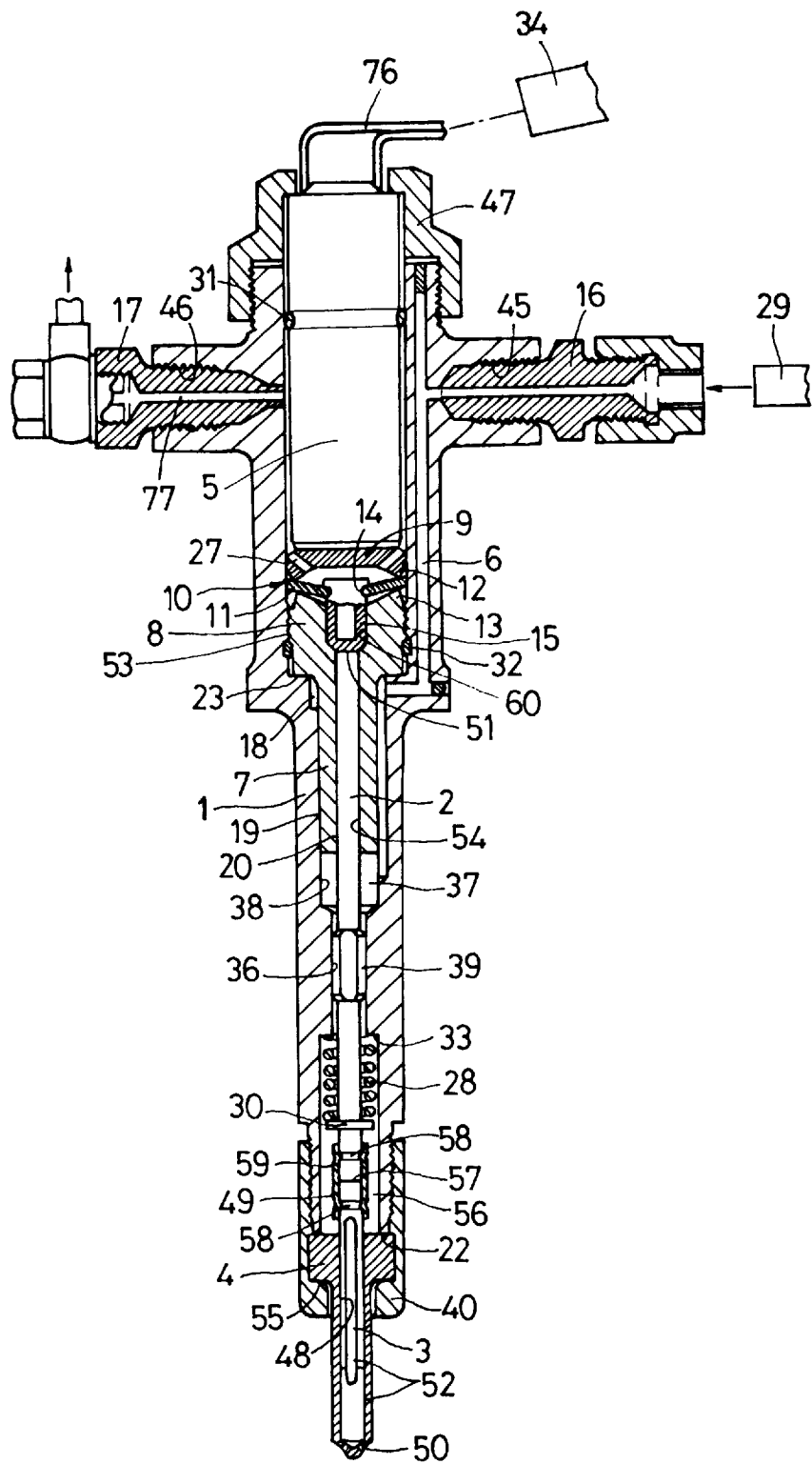
FIG. 3 is a sectional view showing a third embodiment of the fuel injector for internal combustion engines according to the present invention.

A third embodiment of the fuel injector for internal combustion engines according to the present invention will now be described with reference to FIG. 3. As compared with the first embodiment, the third embodiment is not provided with a balancing chamber in a pressure control chamber, and a control piston 2 is adapted to impinge at its upper end surface upon a lower end surface of a lift member 15. Referring to FIG. 3, the parts identical with those shown in FIG. 1 are designated by the same reference numerals, and the duplication of descriptions thereof is omitted. A control sleeve 7 is formed with a support member 8, which is fixed to a holder 1, into an integral body. A control piston 2 is provided slidably in the control sleeve 7, and connected to a needle valve 3. A lower end surface 51 of the lift member 15 is in contact with an upper end surface of the control piston 2 by the resilient force of the disc spring 11, and these surfaces are not fixed to each other. The lift member 15 is moved slidingly in a bore 60 of the support member 8. Although a high-pressure fuel leaks from a fuel chamber 37 and through a clearance between the control piston 2 and a through bore 54 of the control sleeve 7, the interior of the bore 60 communicates with a leak-off plug 17 and does not constitute a high-pressure chamber, so that the pressure balance with respect to the control piston 2 is not lost. The control piston 2 is lowered by a disc spring 11 and a return spring 28 to cause the needle valve 3 to close injection ports 50. When a voltage is applied to a piezoelectric element 5 to release the resilient force of the disc spring 11, the needle valve 3 is lifted with the fuel pressure imparted to the needle valve 3 overcoming the resilient force of the return spring 28. Since a displacement increasing mechanism 10 in the third embodiment has substantially the same construction and function as that 10 of the first embodiment, the description thereof is omitted.

A fourth embodiment of the fuel injector for internal combustion engines according to the present An adjusting belt 73 for fixing under pressure the piezoelectric element 5 to an inner portion of the holder cover 1A is screwed to the adjusting nut 74. A harness 76 inserted in a harness take-out bore 62 and connected to a control unit 34 is connected to the piezoelectric element 5.

Figure 4:
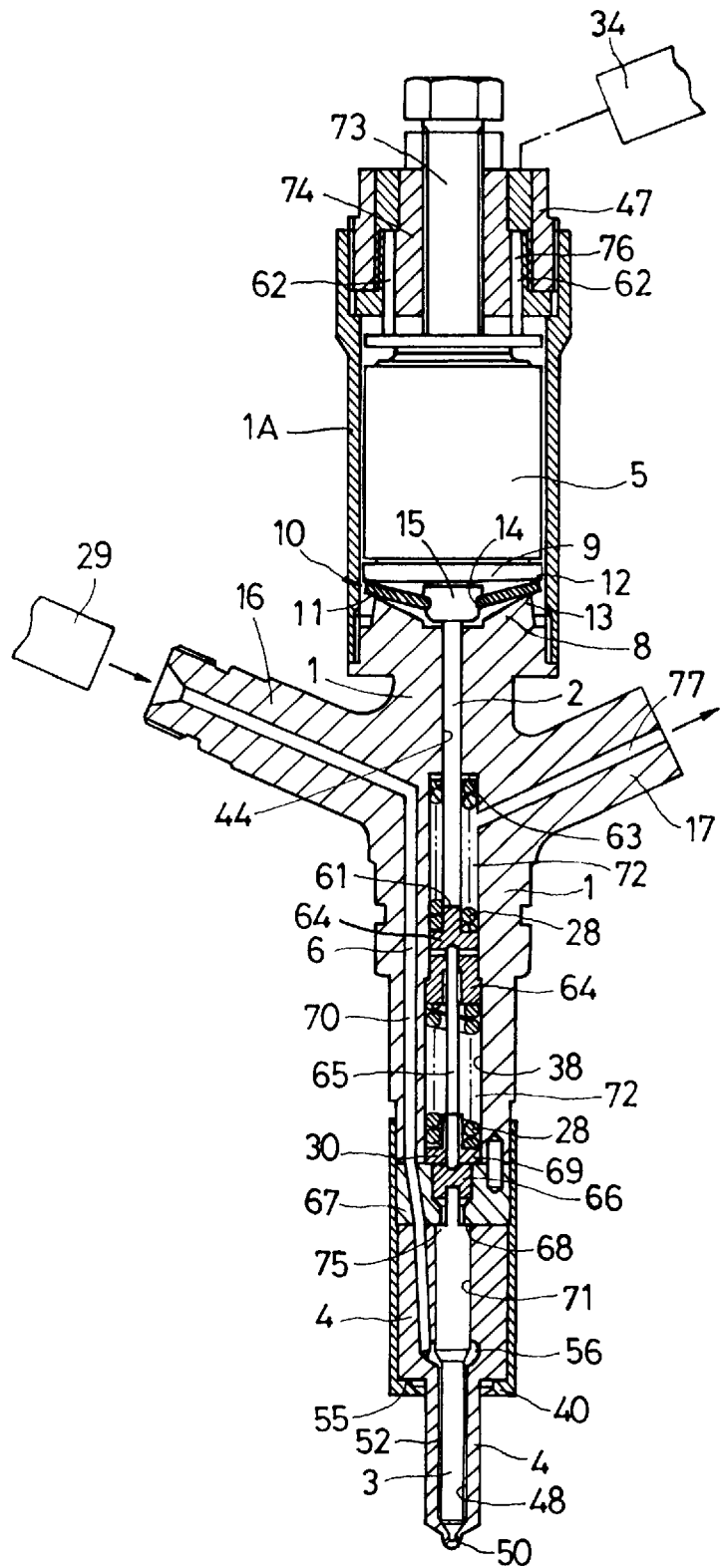
FIG. 4 is a sectional view showing a fourth embodiment of the fuel injector for internal combustion engines according to the present invention.

The holder 1 is provided with a fuel feed bore 70 constituting a fuel passage 6 to which a high-pressure fuel is supplied. A pair of return springs 28 are provided via a spring seat 64 with a pair of return springs 28 in a central through bore 38, and the lower return spring 28 sits at its lower end on a spring seat 69. A lower end surface of the control piston 2 is engaged at a mating face 61 with an upper surface of the spring seat 64. An upper end of the upper return spring 28 sits on a stepped portion 63 formed on the holder 1. The spring seat 69 is placed on a spacer 66 provided in a separated holder 67. A rod 65 is provided between the spring seat 64 and spacer 66 so as to separate the spring seat 64 from spacer 66 with a predetermined distance therebetween. The needle valve 3 is engaged with a lower end of the spacer 66. Accordingly, the control piston 2 is connected to the needle valve 3 via the spring seat 64, rod 65 and spacer 66. A shoulder 75 of the upper end portion of invention will now be described with reference to FIG. 4. As compared with the first embodiment, the fourth embodiment is not provided with a balancing chamber, and the construction of a fuel supply system used in the latter is different from that of the fuel supply system used in the former but a displacement increasing mechanism 10 has an identical structure as that of the first embodiment concerning the basic leverage thereof. Referring to FIG. 4, the parts identical with those shown in FIG. 1 are designated by the same reference numerals, and the duplication of descriptions thereof is omitted. As compared with the previously-described embodiment, the fourth embodiment is provided with a fuel reservoir 56 instead of the fuel chamber 37, a lift member 15 is joined to an upper end portion of and formed with a control piston 2 so as to be integral therewith, and the support member 8 is formed integral with the holder body 1. In a small-diameter central through bore 44 formed in the holder 1, the control piston 2 is slidably inserted. A holder cover 1A constituting a separated holder body is fixed on an upper end portion of the holder 1, and a piezoelectric element 5 is provided in the holder cover 1A. A sleeve nut 47 for fixing an adjusting nut 74 is screwed to the holder cover 1A. the needle valve 3 is engageable with a lower surface of the separated holder 67, and this lower surface forms a lift restriction surface 68 for the needle valve 3. The fuel leaking from a clearance 71 between the nozzle body 4 and needle valve 3 is discharged through a chamber 72 and a leak-off passage 77.

In the fourth embodiment, a lift member 15 is formed into an integral structure with the control piston 2 provided slidably in the holder 1. The lower end surface of the control piston 2 is engaged with the spring seat 64 on which the return springs 28 are seated. The needle valve 3 is pressed down by the resilient force of the return springs 28 and disc spring 11 in the direction in which the injection ports 50 are closed. When the piezoelectric element 5 is energized to cause the resilient force of the disc spring 11 to be released, the needle valve 3 is lifted with the fuel pressure imparted thereto overcoming the resilient force of the return springs 28. Since a displacement increasing mechanism in the fourth embodiment has substantially the same construction and function as that 10 in the first embodiment, the description thereof is omitted.

What is claimed is:

1. A fuel injector for internal combustion engines, comprising an injector body provided with fuel injection ports, a needle valve adapted to be lifted in said injector body and open said injection ports, a control piston joined to said needle valve and adapted to control a sliding movement of said needle valve, a fuel chamber formed in said injector body so as to store a fuel therein, a return spring provided in said fuel chamber and adapted to urge said needle valve in said fuel port closing direction, a piezoelectric element adapted to be displaced in accordance with voltage variation so as to control the lift of said control piston, and a displacement increasing mechanism adapted to increase the displacement of said piezoelectric element so as to lift said needle valve, and transmit the resultant displacement to said control piston, wherein said displacement increasing mechanism comprises a pressure member fixed to said piezoelectric element and provided on its outer circumferential surface with projecting portions having points of application of a displacement force, a hollow support member fixed in the interior of said injector body provided with fulcrum projecting portions, a lift member provided liftably in a hollow portion of said support member, and a disc spring set between said pressure member and said support member with an inner circumferential end portion thereof engaged with said lift member.

2. A fuel injector for internal combustion engines according to claim 1, wherein said disc spring is provided between said pressure member and said support member so that an outer portion of said disc spring is engaged with said projecting portion having points of application of said pressure member, and the portion of said disc spring which is inner than the point of application thereof is engaged with said fulcrum projecting portions of said support member.

3. A fuel injector for internal combustion engines according to claim 1, wherein a distance between said projecting portions having points of application of said pressure member and opposed fulcrum projecting portions of said support member is set shorter than that between said fulcrum projecting portions and a point of engagement at which said disc spring is engaged of said lift member.

4. A fuel injector for internal combustion engines according to claim 1, wherein said lift member is a valve for opening and closing a discharge passage for releasing the fuel pressure in a balancing chamber which is formed by a control sleeve fixed to said injector body, and which is adapted to control the lift of said needle valve by a fuel pressure.

5. A fuel injector for internal combustion engines according to claim 1, wherein said lift member is provided slidably in said control sleeve formed into a unitary body with said support member fixed to said injector body, said lift member being fixed to an upper end portion of said control piston connected to said needle valve.

6. A fuel injector for internal combustion engines according to claim 1, wherein a lower end surface of said lift member is disposed slidably in said control sleeve formed into a unitary body with said support member fixed to said injector body, said lower end surface of said lift member being engaged with an upper end surface of said control piston joined to said needle valve.

7. A fuel injector for internal combustion engines according to claim 1, wherein said lift member is formed into a unitary body with said control piston provided slidably in said injector body, said lower end surface of said control piston being engaged with a spring seat on which said return spring sits, said needle valve being pressed down in said injection port closing direction by the resilient force of said return spring and said disc spring.

* * * * *